United States Patent
Kim et al.

(10) Patent No.: US 10,050,562 B2
(45) Date of Patent: Aug. 14, 2018

(54) TRIBOELECTRIC ENERGY GENERATOR USING CONTROL OF DIPOLE POLARIZATION DIRECTION AND METHOD OF FABRICATING THEREOF

(71) Applicant: RESEARCH & BUSINESS FOUNDATION SUNGKYUNKWAN UNIVERSITY, Suwon-si (KR)

(72) Inventors: Sang Woo Kim, Yongin-si (KR); Wan Chul Seung, Yongin-si (KR); Ju-Hyuck Lee, Suwon-si (KR); Keun Young Lee, Suwon-si (KR); Sang Hyun Kim, Seongnam-si (KR); Hong Joon Yoon, Goyang-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 402 days.

(21) Appl. No.: 14/952,092

(22) Filed: Nov. 25, 2015

(65) Prior Publication Data
US 2016/0164434 A1    Jun. 9, 2016

(30) Foreign Application Priority Data
Dec. 3, 2014 (KR) .................. 10-2014-0172030

(51) Int. Cl.
    *H02N 1/04*      (2006.01)
    *H02N 2/18*      (2006.01)
    *H02N 1/00*      (2006.01)

(52) U.S. Cl.
    CPC ................ *H02N 1/04* (2013.01); *H02N 2/18* (2013.01)

(58) Field of Classification Search
CPC .. H02N 1/04; H02N 1/08; H02N 1/10; H02N 1/12; H02N 2/18; H01B 1/20; H01L 29/78684; H01L 29/66742
See application file for complete search history.

(56) References Cited

U.S. PATENT DOCUMENTS

| | | | | |
|---|---|---|---|---|
| 5,940,054 | A * | 8/1999 | Harris ................ | G02B 26/026 345/107 |
| 9,543,860 | B2 * | 1/2017 | Wang ................ | H02N 1/04 |
| 9,790,928 | B2 * | 10/2017 | Wang ................ | F03G 5/06 |
| 2015/0035408 | A1 * | 2/2015 | Despesse ............ | H02N 1/08 310/310 |
| 2015/0194911 | A1 * | 7/2015 | Kim ................ | H02N 1/04 310/310 |

(Continued)

FOREIGN PATENT DOCUMENTS

| KR | 101532887 B1 * | 7/2015 | ............ H02N 2/18 |
|---|---|---|---|
| KR | 101532889 B1 * | 7/2015 | |

*Primary Examiner* — Edgardo San Martin
(74) *Attorney, Agent, or Firm* — NSIP Law

(57) ABSTRACT

Provided are a triboelectric energy generator using a control of a dipole polarization direction and a method of fabricating the same. The present invention controls a direction of a charging property generated by friction through a control of a dipole polarization using a ferroelectric or piezoelectric property of a material, and by using this control, the present invention is related to a triboelectric energy generator in a disk type in which a frictional charging material is slidable on a thin film only using control of a dipole polarization without need of an additional patterning process and output power is improved.

8 Claims, 7 Drawing Sheets

(56) References Cited

U.S. PATENT DOCUMENTS

2016/0111978 A1* 4/2016 Kim .................. H02N 1/04
                                                310/310
2016/0233792 A1* 8/2016 Park ................. H02N 1/04
2016/0344308 A1* 11/2016 Wang ................ H02N 1/04
2016/0365808 A1* 12/2016 Kim .................. H02N 1/04
2018/0013359 A1* 1/2018 Park ................. H02N 1/04

* cited by examiner

TRIBOELECTRIC ENERGY GENERATOR USING CONTROL OF DIPOLE POLARIZATION DIRECTION AND METHOD OF FABRICATING THEREOF

CROSS-REFERENCE TO RELATED APPLICATIONS

This application claims the benefit of Korean Patent Application No. 2014-0172030, filed with the Korean Intellectual Property Office on Dec. 3, 2014, the entire disclosure of which is incorporated herein by reference for all purposes.

BACKGROUND

1. Field

The present invention relates to a triboelectric energy generator using a control of a dipole polarization direction and a method of fabricating the same.

The present invention controls a direction of a charging property generated by friction through a control of a dipole polarization using a ferroelectric or piezoelectric property of a material, and by using this, the present invention is related to a triboelectric energy generator in a disk type in which a frictional charging material is slidable on a thin film only using the control of the dipole polarization without need of an additional patterning process and output power is improved.

2. Description of Related Art

A triboelectric energy generator using friction is referred to as an eco-friendly energy generator having a new concept in which electricity energy can be infinitely extracted from consumable mechanical energy generated by fine vibration or movement of humans which exists everywhere, in contrast with conventional eco-friendly energy sources such as solar batteries, wind power, fuel cells, etc. An energy conversion method using the electrostatic property has high conversion efficiency, can be used for producing small and light products, and has been evaluated as new technology leading to a breakthrough technological leap and having great impact through convergence of an energy conversion method and nanotechnology.

In an electrostatic energy generator which harvests energy using an electrostatic phenomenon generated by friction, the energy is generated due to a charge difference caused by electrostatic charges generated when two materials are separate from each other after being in contact.

In conventional electrostatic energy generators, output power of the generator is generally determined based on a selection of a material depending on triboelectric series.

Recently, an interest on the triboelectric energy generator has been increased, but the conventional triboelectric energy generator has been generally studied based on a contact using vertical movement. Thus, it has a limit of rotational and linear motion energy not being combined with a simple vertical contact, and to solve this, most research has tried to structurally overcome the limit using a patterning process or different materials.

FIGS. 1A and 1B are schematic views of a triboelectric energy generator according to the related art. As show in FIG. 1A, when movement using a sliding or rotating motion is used for generating triboelectric energy, a first material layer and a second material layer which are charging material layers contacting each other have to be patterned to repeat contact and non-contact states as shown in FIG. 1A.

Meanwhile, as shown in FIG. 1B, there is a triboelectric energy generator having a shape in which a first material layer is moved to contact a second material layer by an external force.

The triboelectric energy generators according to the related art as shown in FIGS. 1A and 1B have shapes in which the charging material layers are patterned, and through the patterning process, the triboelectric energy is generated using the contact and non-contact states between the two material layers.

The patterning process has problems in that an additional process is needed and a cost is increased. To solve this, the following content is proposed by inventors of the present invention.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present invention is directed to providing a triboelectric energy generator capable of forming a thin film drivable in a sliding or rotating structure through a control of a dipole polarization direction using a ferroelectric or piezoelectric property of a material without an additional patterning process, and having high output power by amplifying a charge difference of materials by friction.

One aspect of the present invention provides a triboelectric energy generator using a control of a dipole polarization direction, and the triboelectric energy generator includes a lower electrode layer; a ferroelectric or piezoelectric material layer disposed on the lower electrode layer; and a frictional charging material layer which is disposed on the ferroelectric or piezoelectric material layer in a contact state, is movable, and is an upper electrode, wherein the ferroelectric or piezoelectric material layer is divided into two or more regions in a direction parallel to a surface of the lower electrode layer, in the two or more regions of the ferroelectric or piezoelectric material layer, each region is polarized so that dipole polarization directions of the regions disposed next to each other are different from each other, and triboelectric energy is generated by continuous charging and friction caused by sliding or rotating the frictional charging material layer.

Another aspect of the present invention provides a triboelectric energy generator using a control of a dipole polarization direction, and the triboelectric energy generator includes a lower electrode layer; a ferroelectric or piezoelectric material layer disposed on the lower electrode layer; a frictional charging material layer disposed on the ferroelectric or piezoelectric material layer in a contact state and configured to be movable; and an upper electrode layer disposed on the frictional charging material layer, wherein the ferroelectric or piezoelectric material layer is divided into two or more regions in a direction parallel to a surface of the lower electrode layer, in the two or more regions of the ferroelectric or piezoelectric material layer, each region is polarized so that dipole polarization directions of the regions disposed next to each other are different from each other, and triboelectric energy is generated by continuous charging and friction caused by sliding or rotating the frictional charging material layer.

The triboelectric energy generator may further include withdrawable parts respectively connected to the lower electrode and the upper electrode, wherein an energy storage part may be connected to the withdrawable parts. Further, rectifier diodes may be connected between the withdrawable parts and the energy storage part.

Still another aspect of the present invention provides a method of fabricating a triboelectric energy generator using a control of a dipole polarization direction, and the method includes (i) providing a lower electrode layer; (ii) disposing a ferroelectric or piezoelectric material layer on the lower electrode layer; (iii) disposing a frictional charging material layer which is disposed on the ferroelectric or piezoelectric material layer in a contact state and is a movable upper electrode; (iv) applying an external voltage to the lower electrode layer and the frictional charging material layer, polarizing a dipole of the ferroelectric or piezoelectric material layer in one direction, and forming a first region; and (v) moving the frictional charging material layer until the frictional charging material layer passes from the first region, applying an external voltage to the lower electrode layer and the frictional charging material layer in a direction opposite a voltage direction when the first region is formed, polarizing a dipole of the ferroelectric or piezoelectric material layer to have a different polarization direction from the dipole polarization direction of the first region, and forming a second region, wherein the operation (v) is repeatable multiple times based on the number of regions of the ferroelectric or piezoelectric material layer.

Yet another aspect of the present invention provides a method of fabricating a triboelectric energy generator using a control of a dipole polarization direction, and the method includes (i) providing a lower electrode layer; (ii) disposing a ferroelectric or piezoelectric material layer on the lower electrode layer; (iii) disposing a frictional charging material layer which is disposed on the ferroelectric or piezoelectric material layer in a contact state, is movable, and has a separate upper electrode; (iv) applying an external voltage to the lower electrode layer and the frictional charging material layer, polarizing a dipole of the ferroelectric or piezoelectric material layer in one direction, and forming a first region; and (v) moving the frictional charging material layer until the frictional charging material layer passes from the first region, applying an external voltage to the lower electrode layer and the frictional charging material layer in a direction opposite a voltage direction when the first region is formed, polarizing a dipole of the ferroelectric or piezoelectric material layer to have a different polarization direction from the dipole polarization direction of the first region, and forming a second region, wherein the operation (v) is repeatable multiple times based on the number of regions of the ferroelectric or piezoelectric material layer.

The method may further include connecting respective withdrawable parts to the lower electrode and the upper electrode, and connecting an energy storage part to the withdrawable parts.

Meanwhile, rectifier diodes are connected between the withdrawable parts and the energy storage part.

According to the present invention, a "self-powered" device with high mechanical stability and reliability, which can be driven continuously and independently, can be implemented by converting mechanical energy, which is consumable and generated from movement of humans, vehicles on roads, trains on rails, etc., into electrical energy, and thus a dramatic leap in the energy field is expected.

Particularly, unlike the related art, since the method of controlling the dipole polarization without an additional patterning process is used, triboelectric energy can be easily obtained by not only simple vertical contact, but also driving such as rotating, sliding, etc.

Other features and aspects will be apparent from the following detailed description, the drawings, and the claims.

Example aspects of the present invention will be described in detail with reference to the accompanying drawings. It should be understood that the same signs throughout the drawings refer to the same elements. Particular specific contents are described in the following Modes of the Invention, which are intended to help overall understanding. However, it is apparent that the aspects can be performed without these specific details. In the aspects, well-known structures and devices are presented in block diagram form to easily explain the aspects.

DETAILED DESCRIPTION

Hereinafter, brief descriptions of one or more aspects will be provided to provide a basic concept of the aspect of the present invention. This section is not intended to provide a comprehensive concept with respect to all possible aspects, and to distinguish core elements of all elements or to cover the scope of all aspects. The only objective is providing a concept of one or more aspects with simplified forms as the introduction of detailed descriptions which will be suggested below.

Figure 1A:
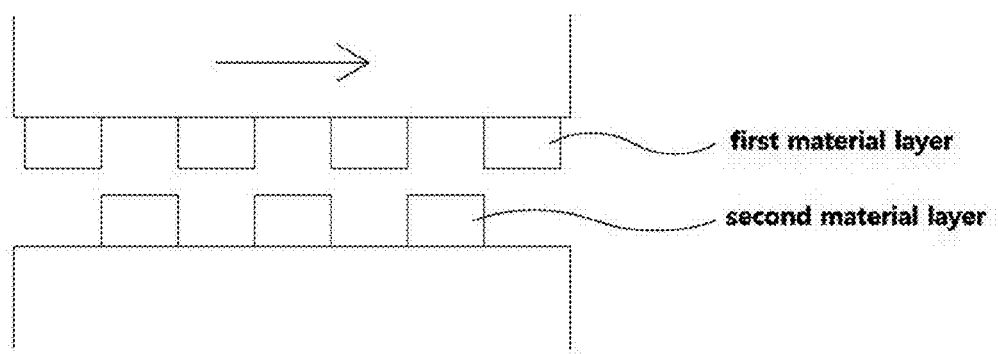
FIGS. 1A and 1B are schematic views of a triboelectric energy generator according to the related art.
Figure 1B:
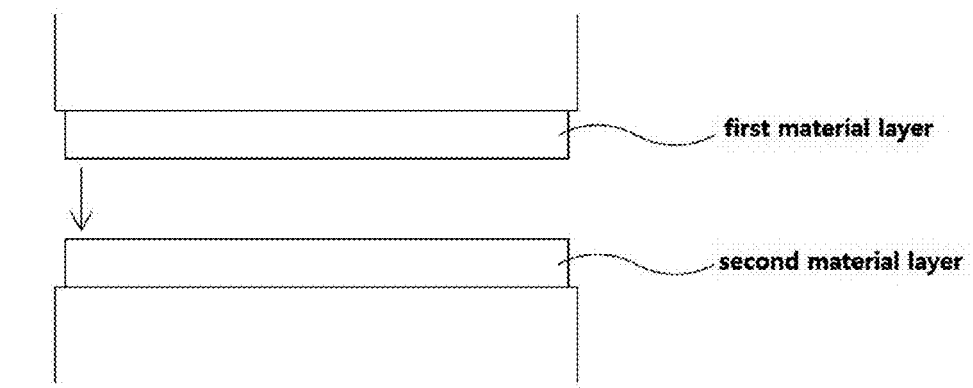

As shown in FIGS. 1A and 1B, a triboelectric energy generator using friction is implemented through a patterning process in the case of a triboelectric energy generator according to the related art, but the present invention is directed to providing a triboelectric energy generator which may be driven with a sliding or rotating structure without an additional patterning process through a dipole polarization control using a property of a ferroelectric or piezoelectric material, and amplify a charge difference of materials caused by friction to output high power.

A triboelectric energy generator using a control of a dipole polarization direction according to one aspect of the present invention will be described first, and a method of fabricating the same will be subsequently described.

Figure 2:
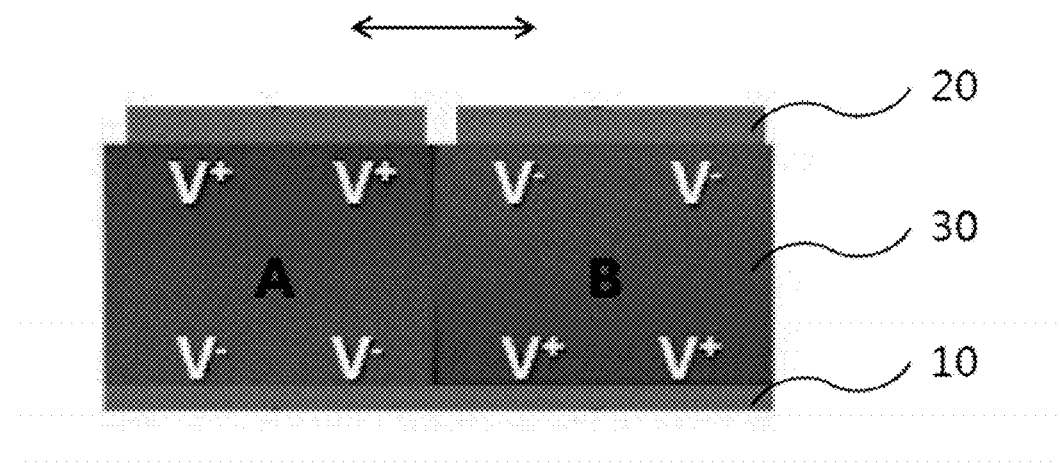
FIG. 2 is a schematic view of a triboelectric energy generator according to one aspect of the present invention.
Figure 3:
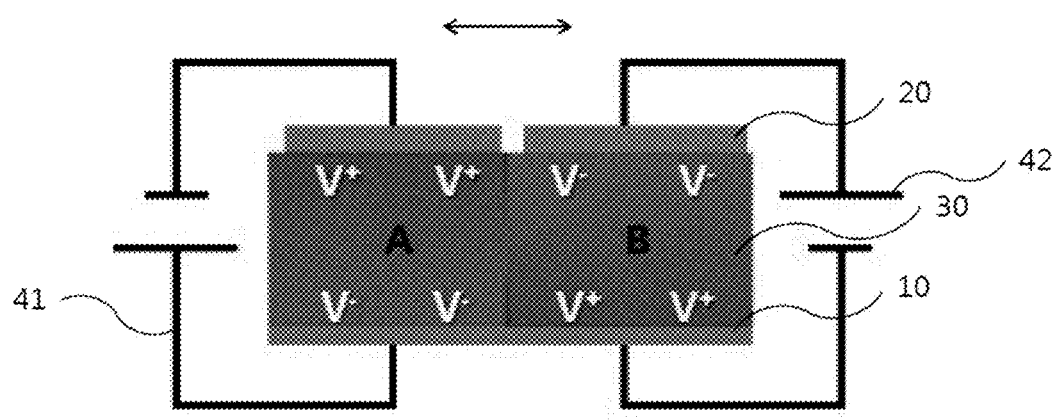
FIG. 3 is a schematic view of triboelectric energy generator according to one aspect of the present invention.

FIGS. 2 and 3 are schematic views of a triboelectric energy generator using a control of a dipole polarization direction according to one aspects of the present invention.

The triboelectric energy generator using the control of the dipole polarization direction according to one aspects of the present invention includes a lower electrode layer 10, a ferroelectric or piezoelectric material layer 30 disposed on the lower electrode layer 10, and a frictional charging material layer 20 disposed on the ferroelectric or piezoelectric material layer 30 in a contact state and configured to be movable.

The lower electrode layer 10 may use any conductive material, such as a metal, a polymer, etc., when the conductive material is for an electrode material, and there is no particular limitation on the electrode material. A typical electrode material includes copper (Cu), aluminum (Al), silver (Ag), gold (Au), platinum (Pt), titanium (Ti), indium tin oxide (ITO), or a conductive polymer (e.g., PEDOT: PSS).

As shown in FIGS. 2 to 5, the ferroelectric or piezoelectric material layer 30 is divided into two or more regions in a direction parallel to a surface of the lower electrode layer 10, and there is no specific limit to the number of regions. It is determined that the ferroelectric or piezoelectric material layer 30 is divided into two regions in FIG. 2, and divided into four regions in FIGS. 5 and 6.

Since polarities of the ferroelectric or piezoelectric material layer 30 may be arranged through a poling process, the poling process has to be performed. Both positive and negative poling processes may be performed on the ferroelectric or piezoelectric material layer 30. A typical material of the ferroelectric or piezoelectric material layer 30 includes PVDF, PZT, PTO, BTO, BFO, $KNbO_3$, $NaNbO_3$, GeTe, ZnO, $ZnSnO_3$, GaN, etc.

Two or more regions of the ferroelectric or piezoelectric material layer 30 are laterally disposed in parallel and are respectively polarized so that dipole polarization directions of the regions are different.

The ferroelectric or piezoelectric material layer 30 is divided into two regions in FIG. 2, and the two regions are respectively indicated as a region A and a region B. The ferroelectric or piezoelectric material layer 30 is divided into four regions in FIG. 6, and the four regions are respectively indicated as regions A, B, C, and D.

In FIG. 2, a polarization control of dipole polarization of the region A is directed to top (i.e., positive) from bottom (i.e., negative), and a polarization control of dipole polarization of the region B is directed to bottom (i.e., positive) from top (i.e., negative).

In that way, the ferroelectric or piezoelectric material layer 30 is divided into two or more regions in a direction parallel to the surface of the lower electrode layer 10, and the polarization is controlled so that dipole polarization directions of adjacent regions are different. Through this, triboelectric energy is generated by continuous charging due to movement (sliding or rotation) of an upper electrode.

The frictional charging material layer 20 may serve as an electrode by itself, or may further include an additional upper electrode layer. The frictional charging material layer 20 is disposed on the ferroelectric or piezoelectric material layer 30 in a contact state and is movable.

Any material may be used for the frictional charging material layer 20, and there is no particular limit on the material. However, when a charging property of the material is greatly different from a material used for the ferroelectric or piezoelectric material layer 30 which is a contact target in a triboelectric series, a generated voltage is also high, and thus the material having the greatly different charged property is preferable.

There is no particular limit on a size of the frictional charging material layer 20, but a size the same as that of one region of the ferroelectric or piezoelectric material layer 30 is preferable. The frictional charging material layer 20 moves on each region, and thus continuous charging is generated and amplification of a charging difference caused by friction is generated. The size may be a size of the region A i shown in FIG. 2, and may be a size of one region shown in FIG. 4.

In FIGS. 2 and 3, the frictional charging material layer 20 is illustrated like two layers, but this is for indicating that lateral movement of the frictional charging material layer 20 is possible. Meanwhile, when the number of regions is three or more, the number of the frictional charging material layers may also be plural number. Voltages are collectable in each region by continuous charging and friction using the plurality of frictional charging material layers.

FIG. 3 is a view of controlling polarization of regions by applying an external voltage to the ferroelectric or piezoelectric material layer.

The frictional charging material layer 20 is first positioned on the region A, and polarization is performed by applying a voltage 41 shown in FIG. 3. Then, the frictional charging material layer 20 is moved to the region B, and polarization is performed by applying a voltage 42. Polarization directions of the region A and the region B are controlled to be different by the above polarization process.

Figure 4:
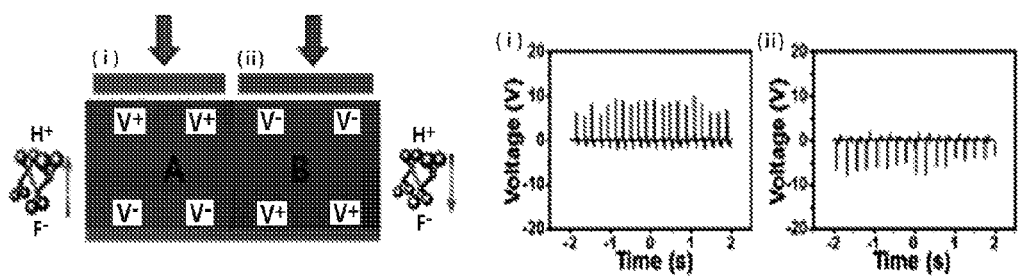
FIG. 4 is a view of an output direction control test according to controlled polarization of a triboelectric energy generator according to one aspect of the present invention.

FIG. 4 is an experiment to determine output directions with respect to the region A and the region B having different polarization directions shown in FIG. 3. As shown in FIG. 4, it is determined that voltages of a region (i), which is the region A, are shown as positive peaks, and voltages of a region (ii), which is the region B, are shown as negative peaks. Accordingly, it may be determined that the polarization directions of the region A and the region B are controlled to be different.

Figure 5:
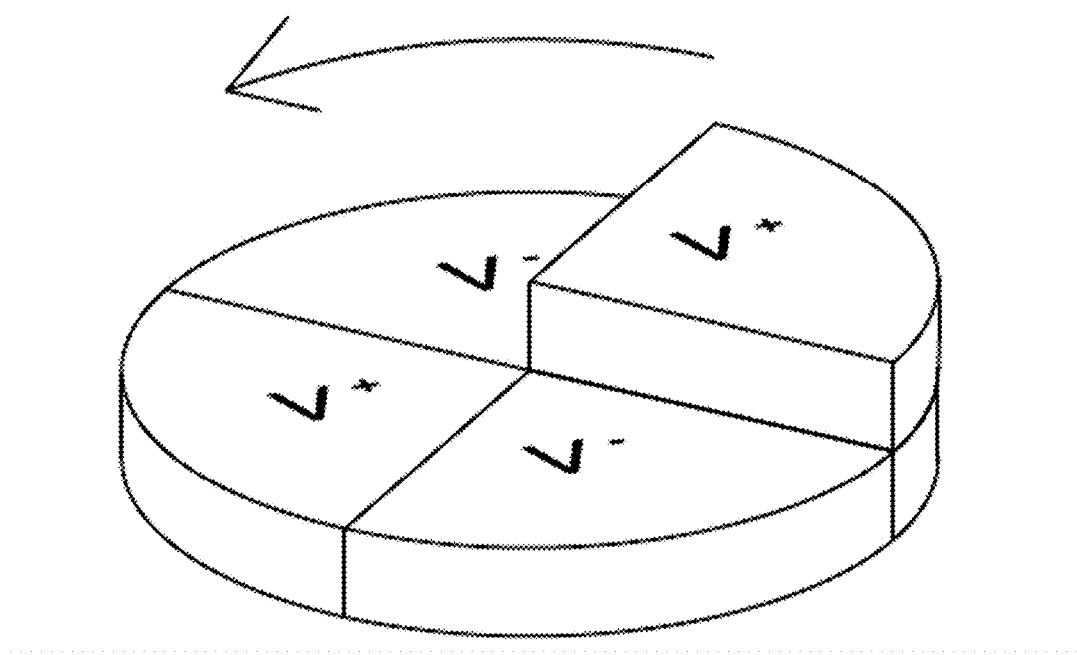
FIG. 5 is a schematic view of a triboelectric energy generator according to an additional aspect of the present invention.

FIG. 5 is a schematic view of a triboelectric energy generator according to an additional aspect of the present invention.

FIG. 5 illustrates a different shape from the aspect shown in FIG. 2. The case shown in FIG. 2 is a sliding type and the case shown in FIG. 5 is a rotating disk type. A frictional charging material is formed in a rotatable shape, and is rotated on a region divided into four regions, and thus continuous charging is generated, a charging difference caused by friction is amplified, and triboelectric energy is collected.

Figure 6:
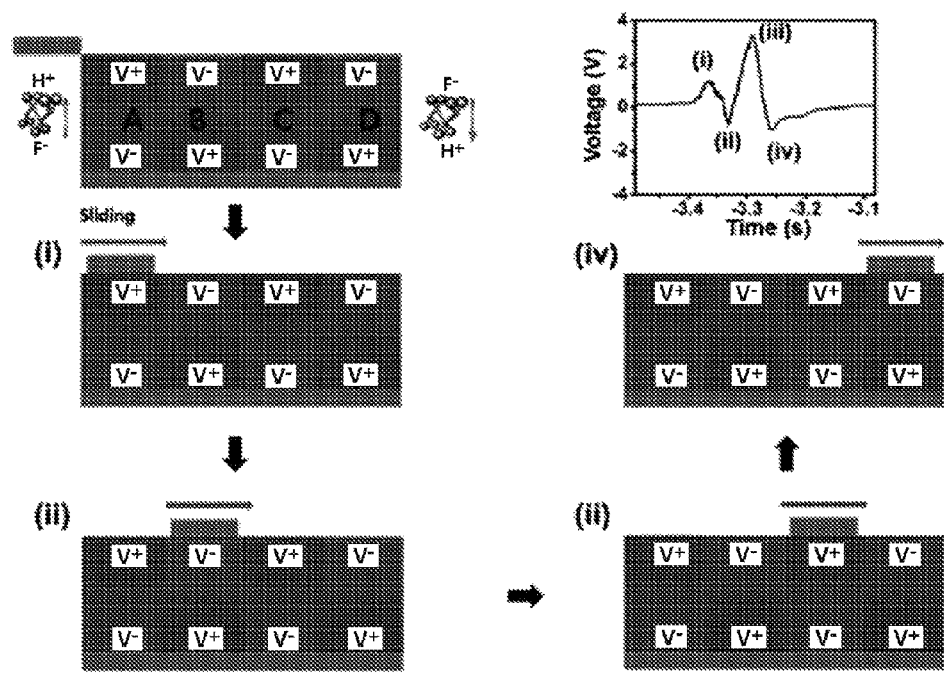
FIG. 6 is a view illustrating a driving principle of a triboelectric energy generator according to one aspect of the present invention.

FIG. 6 is a view illustrating a driving principle of a triboelectric energy generator according to one aspect of the present invention.

In FIG. 6, a ferroelectric or piezoelectric material layer is divided into four regions A, B, C, and D, and a frictional charging material in a sliding type is moved on each region by sliding. In the movement, since each region has a different dipole polarization direction from a region disposed next to it, continuous charging and friction are generated whenever the frictional charging material passes through the region, and output peaks thereof are shown as a graph at an upper right portion of FIG. 6. It may be determined that a charging difference is amplified more in a region (iii) after passing through a region (ii) than in a region (i).

Meanwhile, withdrawable parts respectively connected to a lower electrode and an upper electrode may be additionally included to be used in the energy generator. An energy storage part, such as a storage battery, may be connected to the withdrawable parts. Rectifier diodes may be respectively connected between the withdrawable parts and the energy storage part. A load may be connected to lead cables to directly turn on a light bulb. Meanwhile, the diode is a rectifier diode, and thus, serves to flow a current in any one direction to prevent the storage battery 60 from discharging due to a reverse flow of the current.

Hereinafter, a method of fabricating a triboelectric energy generator using a control of a dipole polarization direction according to one aspect of the present invention will be described.

The method of fabricating the triboelectric energy generator using the control of the dipole polarization direction according to one aspect of the present invention includes (i) providing a lower electrode layer, (ii) disposing a ferroelectric or piezoelectric material layer on the lower electrode layer, (iii) disposing a frictional charging material layer which is disposed on the ferroelectric or piezoelectric material layer in a contact state and is a movable upper electrode, (iv) forming a first region by applying an external voltage to the lower electrode layer and the frictional charging material layer to polarize a dipole of the ferroelectric or piezoelectric material layer in one direction, and (v) forming a second region, by moving the frictional charging material layer until the frictional charging material layer passes from the first region, applying an external voltage to the lower electrode layer and the frictional charging material layer in a direction opposite the voltage direction when the first region is formed, and polarizing a dipole of the ferroelectric or piezoelectric material layer to have a different polarization direction from the dipole polarization direction of the first region.

Further, when a region is divided into three or more regions, operation (v) may be repeated multiple times based on the number of regions of the ferroelectric or piezoelectric material layer. That is, to make four regions as shown in FIG. 6, the same process as operation (v) is required two more times after operation (v) is complete.

Meanwhile, the frictional charging material may be used as an electrode in some cases, but a separate electrode may be used in other cases.

Since the content of the remaining lower electrode layer, ferroelectric or piezoelectric material layer, and frictional charging layer has already been described above, the same content will be omitted.

As described above, the triboelectric energy generator using the control of the dipole polarization direction according to one aspect of the present invention can form a thin film drivable in a sliding or rotating structure through the control of the dipole polarization direction using a ferroelectric or piezoelectric property of a material without an additional patterning process, and can also be implemented as a triboelectric energy generator having high output power by amplifying a charge difference of materials by friction.

While the present invention has been specifically described with reference to example aspects, it will be understood by those of skill in the art that various changes in form and details may be made without departing from the spirit and scope of the present invention. Therefore, the example aspects should be considered in a descriptive sense only and not for purposes of limitation. The scope of the invention is defined not by the detailed description of the invention but by the appended claims, and encompasses all modifications and equivalents that fall within the scope of the appended claims.

What is claimed is:

1. A triboelectric energy generator using a control of a dipole polarization direction, comprising:
   a lower electrode layer;
   a ferroelectric or piezoelectric material layer disposed on the lower electrode layer; and
   a frictional charging material layer which is disposed on the ferroelectric or piezoelectric material layer in a contact state, is movable, and is an upper electrode,
   wherein the ferroelectric or piezoelectric material layer is divided into two or more regions in a direction parallel to a surface of the lower electrode layer,
   in the two or more regions of the ferroelectric or piezoelectric material layer, each region is polarized so that dipole polarization directions of the regions disposed next to each other are different from each other, and
   triboelectric energy is generated by continuous charging and friction caused by sliding or rotating the frictional charging material layer.

2. A triboelectric energy generator using a control of a dipole polarization direction, comprising:
   a lower electrode layer;
   a ferroelectric or piezoelectric material layer disposed on the lower electrode layer;
   a frictional charging material layer disposed on the ferroelectric or piezoelectric material layer in a contact state and configured to be movable; and
   an upper electrode layer disposed on the frictional charging material layer,
   wherein the ferroelectric or piezoelectric material layer is divided into two or more regions in a direction parallel to a surface of the lower electrode layer,
   in the two or more regions of the ferroelectric or piezoelectric material layer, each region is polarized so that dipole polarization directions of the regions disposed next to each other are different from each other, and
   triboelectric energy is generated by continuous charging and friction caused by sliding or rotating the frictional charging material layer.

3. The triboelectric energy generator of claim 1, further comprising withdrawable parts respectively connected to the lower electrode and the upper electrode, wherein an energy storage part is connected to the withdrawable parts.

4. The triboelectric energy generator of claim 3, wherein rectifier diodes are connected between the withdrawable parts and the energy storage part.

5. A method of fabricating a triboelectric energy generator using a control of a dipole polarization direction, comprising:
   (i) providing a lower electrode layer;
   (ii) disposing a ferroelectric or piezoelectric material layer on the lower electrode layer;
   (iii) disposing a frictional charging material layer which is disposed on the ferroelectric or piezoelectric material layer in a contact state and is a movable upper electrode;
   (iv) applying an external voltage to the lower electrode layer and the frictional charging material layer, polarizing a dipole of the ferroelectric or piezoelectric material layer in one direction, and forming a first region; and
   (v) moving the frictional charging material layer until the frictional charging material layer passes from the first region, applying an external voltage to the lower electrode layer and the frictional charging material layer in a direction opposite a voltage direction when the first region is formed, polarizing a dipole of the ferroelectric or piezoelectric material layer to have a different polarization direction from the dipole polarization direction of the first region, and forming a second region,
   wherein the operation (v) is repeatable multiple times based on the number of regions of the ferroelectric or piezoelectric material layer.

6. A method of fabricating a triboelectric energy generator using a control of a dipole polarization direction, comprising:

(i) providing a lower electrode layer;
(ii) disposing a ferroelectric or piezoelectric material layer on the lower electrode layer;
(iii) disposing a frictional charging material layer which is disposed on the ferroelectric or piezoelectric material layer in a contact state, is movable, and has a separate upper electrode;
(iv) applying an external voltage to the lower electrode layer and the frictional charging material layer, polarizing a dipole of the ferroelectric or piezoelectric material layer in one direction, and forming a first region; and
(v) moving the frictional charging material layer until the frictional charging material layer passes from the first region, applying an external voltage to the lower electrode layer and the frictional charging material layer in a direction opposite a voltage direction when the first region is formed, polarizing a dipole of the ferroelectric or piezoelectric material layer to have a different polarization direction from the dipole polarization direction of the first region, and forming a second region, wherein the operation (v) is repeatable multiple times based on the number of regions of the ferroelectric or piezoelectric material layer.

7. The method of claim 5, further comprising:
connecting respective withdrawable parts to the lower electrode and the upper electrode; and
connecting an energy storage part to the withdrawable parts.

8. The method of claim 7, wherein rectifier diodes are connected between the withdrawable parts and the energy storage part.

* * * * *